(12) United States Patent
Smith

(10) Patent No.: US 6,965,685 B1
(45) Date of Patent: Nov. 15, 2005

(54) BIOMETRIC SENSOR

(75) Inventor: Mark T. Smith, San Mateo, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 424 days.

(21) Appl. No.: 09/945,982

(22) Filed: Sep. 4, 2001

(51) Int. Cl.⁷ .............................................. G06K 9/00
(52) U.S. Cl. ....................................... 382/115; 283/68
(58) Field of Search ........................ 382/100, 115, 116, 382/133, 141, 254, 124, 127; 235/462.01, 235/462.11, 454, 494; 250/201.3, 221, 231.13, 250/306, 307; 436/1, 164, 165; 356/73, 237.5, 356/394, 419; 283/68, 78; 340/5.52, 5.53, 340/5.82, 5.83; 396/15; 713/186; 902/3

(56) References Cited

U.S. PATENT DOCUMENTS

| | | | |
|---|---|---|---|
| 4,475,238 A | 10/1984 | Everhart | |
| 4,641,350 A | 2/1987 | Bunn | |
| 5,054,090 A * | 10/1991 | Knight et al. | 382/127 |
| 5,248,873 A * | 9/1993 | Allen et al. | 250/208.1 |
| 5,573,953 A * | 11/1996 | Marnie et al. | 436/164 |
| 5,761,330 A * | 6/1998 | Stoianov et al. | 382/127 |
| 5,790,247 A | 8/1998 | Henley et al. | |
| 5,974,162 A * | 10/1999 | Metz et al. | 382/124 |
| 5,984,366 A * | 11/1999 | Priddy | 283/72 |
| 6,148,094 A * | 11/2000 | Kinsella | 382/124 |
| 6,193,153 B1 * | 2/2001 | Lambert | 235/380 |
| 6,246,050 B1 * | 6/2001 | Tullis et al. | 250/231.13 |
| 6,307,956 B1 * | 10/2001 | Black | 382/124 |
| 6,535,622 B1 * | 3/2003 | Russo et al. | 382/124 |

FOREIGN PATENT DOCUMENTS

| | | |
|---|---|---|
| EP | 0918300 A2 | 5/1999 |
| EP | 1063602 A2 | 12/2000 |
| FR | 2765369 A1 | 6/1997 |
| WO | WO00/60530 | 10/2000 |

OTHER PUBLICATIONS

S.W. Grotta, "Bio-Keys," PC Magazine, vol. 20, No. 11, Jun. 12, 2001, pp. 162-174.

Petros Maragos—"Optimal Morphological Approaches to Image Matching and Object Detection"—1998 IEEE—pp. 695-699.

* cited by examiner

*Primary Examiner*—Kanjibhai Patel
*Assistant Examiner*—Abolfazl Tabatabai

(57) ABSTRACT

Biometric sensing is performed by generating an input digital image of a human attribute; and correlating domains of lightness and darkness in the input digital image to domains of lightness and darkness in a reference digital image.

26 Claims, 3 Drawing Sheets

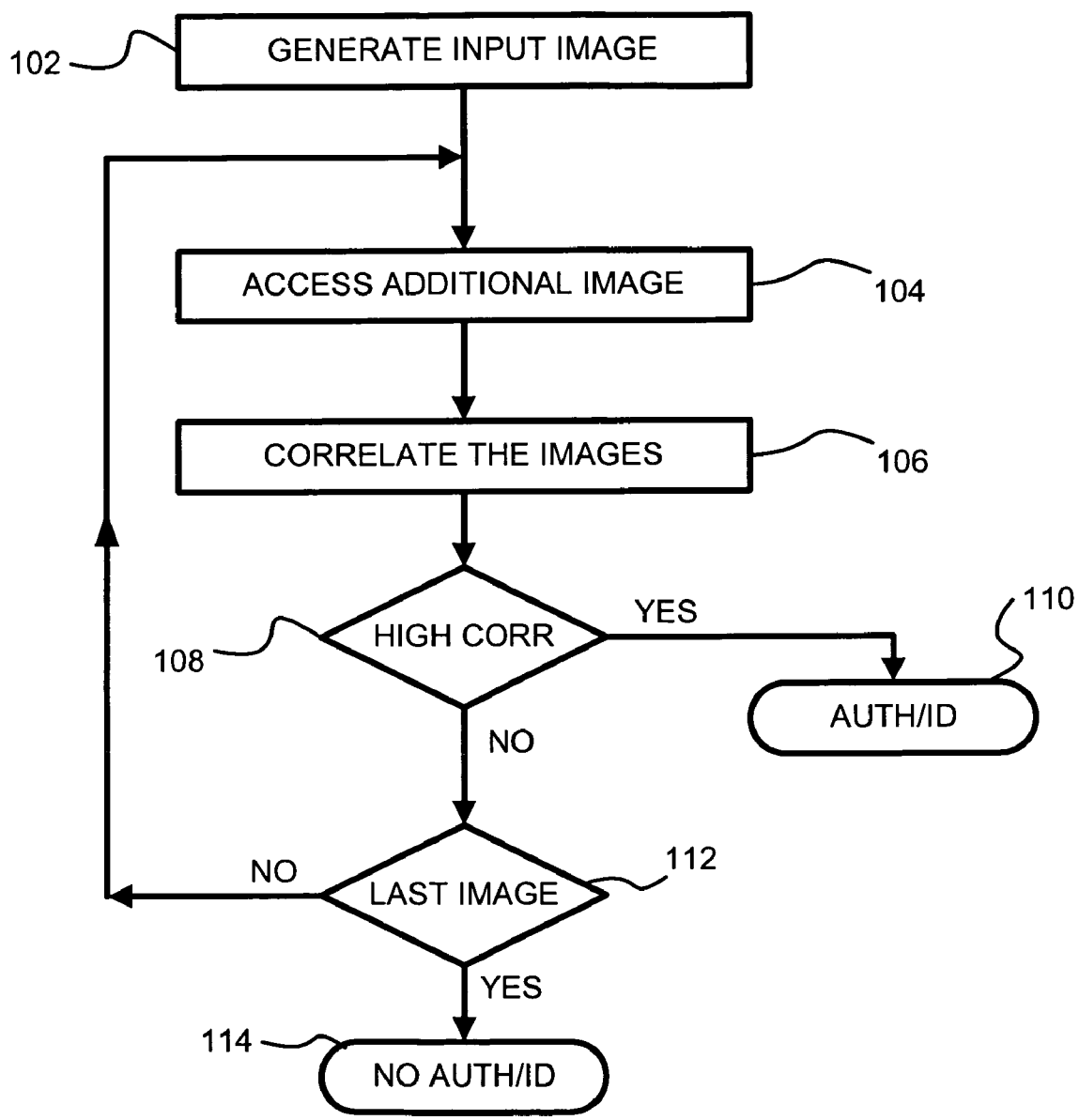

BIOMETRIC SENSOR

BACKGROUND

Biometric devices record fingerprints, faces, voices, irises, retinas, signatures and other physical attributes. The recorded attributes may be compared to reference data for authentication or identification purposes.

Biometric authentication involves comparing a recorded attribute to the reference data of a person who has already been identified. That person may have been identified by a smart card, a password, or some other piece of information. If the recorded attribute matches the reference data, the identify of the person is verified.

The uses for biometric authentication are quite varied. Biometric authentication devices may be used to verify attendance in the work place, control physical access to restricted areas, and verify the identities of parties to transactions.

Biometric authentication addresses the ever-increasing need for security on government and corporate networks, the Internet and public facilities. Biometric authentication offers advantages over conventional security measures such as passwords. Unlike passwords, biometric attributes are not easy to forget, and they are very difficult to duplicate.

Biometric identification involves comparing a recorded attribute to reference data for different people. If the recorded attribute matches the reference data of one of the people, a positive identification is made. Biometric identification devices can be used to pick out faces in crowds, control access to restricted areas, etc.

Many commercial biometric devices for performing face, iris, retinal and fingerprint scans are large, complicated and expensive.

A small compact, inexpensive, lightweight device would be highly desirable.

SUMMARY

According to one aspect of the present invention, biometric sensing is performed by generating an input digital image of a human attribute; and correlating domains of lightness and darkness in the input digital image to domains of lightness and darkness in a reference digital image. Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 2 is an illustration of a method of performing biometric sensing according to the present invention.

DETAILED DESCRIPTION

Figure 1:
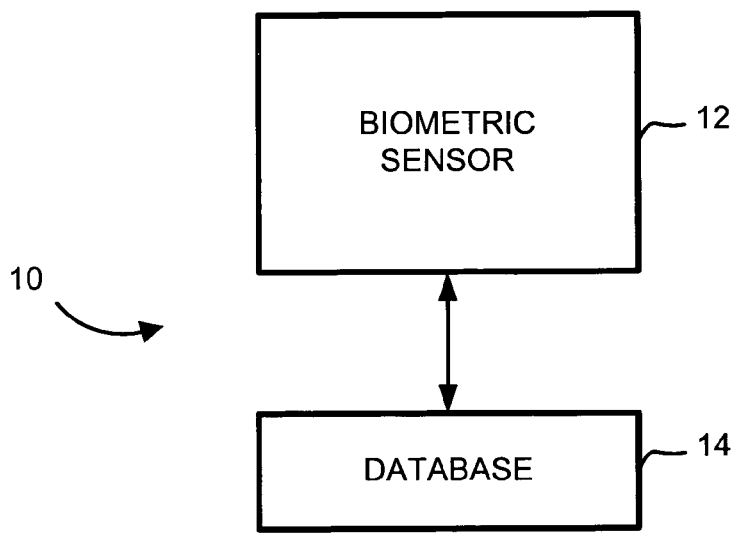
FIG. 1 is a block diagram of a biometric sensing system according to the present invention.

Reference is made to FIGS. 1 and 2. A biometric sensing system 10 includes a biometric sensor 12 and an electronic database 14. The database 14, which may be stored on a personal computer or any other data storage device, contains images of fingerprints, retinas, faces, or other physical attributes of one person or different people. The biometric sensing system 10 may perform biometric authentication and biometric identification.

During biometric authentication of a person, the biometric sensor 12 senses a specific physical attribute of the person (e.g., a thumbprint) and generates an input digital image of the sensed attribute (block 102). The biometric sensor 12 also inputs reference data (block 104). For example, the reference data may be a reference image that is obtained from the database 14. The database 14 might include reference images for other people as well. Since identification information about the person is already available, however, only the reference image corresponding to that person is selected from the database 14.

The biometric sensor 12 correlates the input and reference images (block 106). Domains of lightness and darkness in the input digital image are correlated to domains of lightness and darkness in the reference digital image If a "high" correlation is detected (block 108), the biometric sensor 12 indicates that the identify of the person has been verified (block 110).

The result of the correlation may be compared to a reference value to determine whether the correlation is high. The correlation of the input and reference images does not have to be exact for authentication to occur. Certain variables should be taken into account when determining the reference value. These variables include changes in sensing conditions and changes in the physical attribute. For example, different biometric sensors might have different responses, and they might be calibrated differently. Background illumination conditions for the input image might be different than the background illumination conditions for the reference image.

Physical attributes might have changed. If a facial scan is performed, the person might have changed his or her hair style after the reference image was taken. Clothing might have changed. The person might be wearing different glasses, or no glasses at all. The reference value should be set with these variables in mind as well.

Orientation of the attribute in the input image might be different than the orientation of the attribute in the reference image. The difference in orientations, however, can be compensated by generating additional images and performing additional correlations.

If the correlation is not high (block 108), an additional image is accessed (block 104) and another correlation is performed (block 106). An additional reference image may be accessed from the database 14 and correlated with the input image. The additional reference image may show the attribute in a different view or at a different orientation or size. The different orientation might involve a translation (e.g., a one pixel translation) or a rotation (e.g., a one degree rotation) of the attribute.

If none of the additional images result in a high correlation (block 112), the biometric sensor 12 indicates that the identify of the person has not been verified (block 114).

The biometric identification is similar to the biometric authentication, except that the input image is compared to reference images corresponding to different people. The person corresponding to the reference image having the highest correlation is identified. Thus, the result of the correlation is to identify a person, not simply verify the identity of the person.

For instance, the database 14 stores reference image sets of thumbprints of different people who are allowed access to a room. Each image set shows a thumbprint at different orientations and positions. A person attempting to enter the room swipes his or her thumb across a scanning plane of the biometric sensor 12. The biometric sensor 12 generates an input image of the thumbprint, correlates the input image to the images in the reference image sets, and identifies the reference image having the highest correlation. If the correlation is not within acceptable limits, access to the room is denied. If the correlation is within acceptable limits, the biometric sensor 12 may then prompt the user for additional information (e.g., name, identification number). If the additional information matches that in the database 14, the person is granted access to the room. If not, access is denied.

Figure 3:
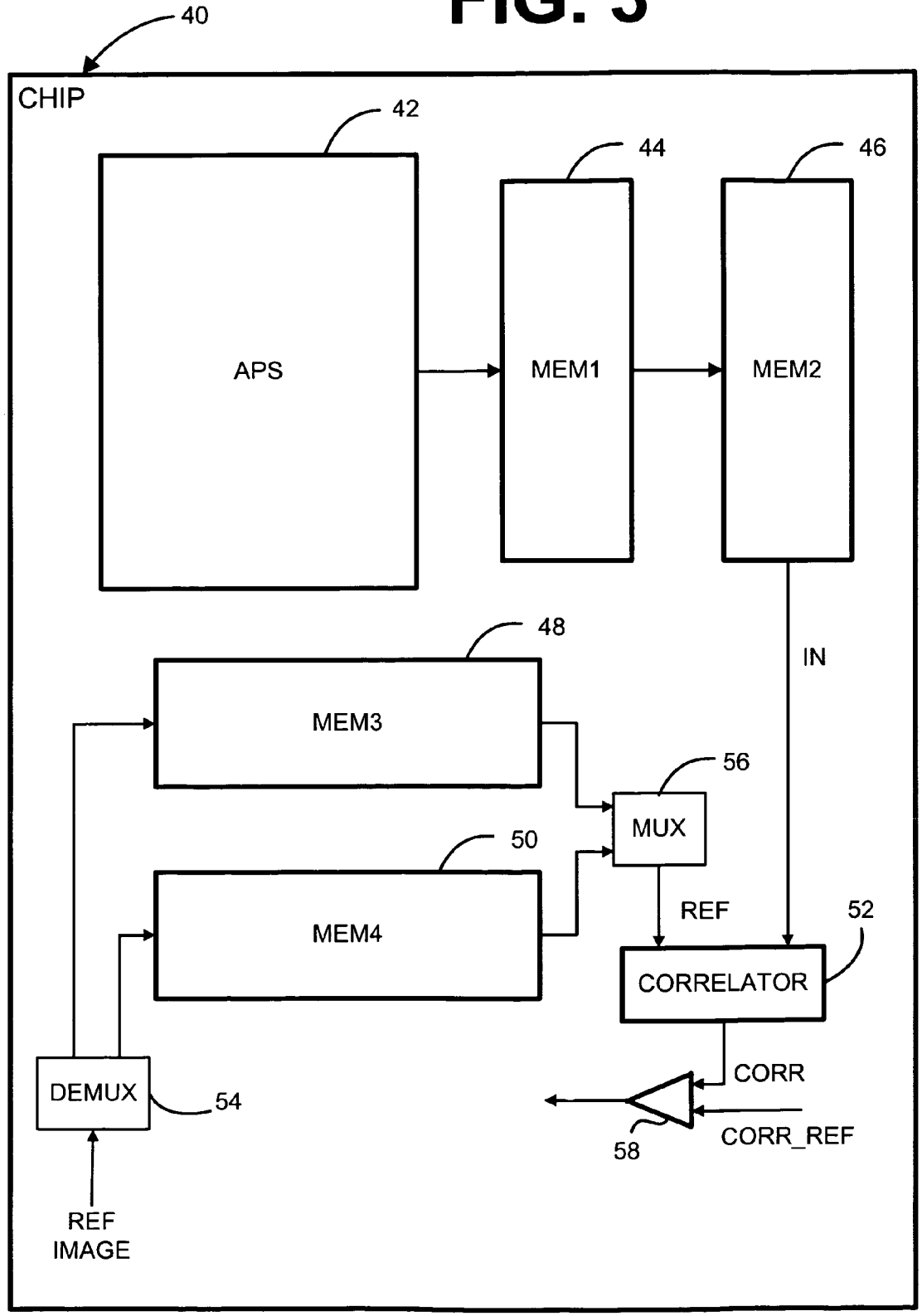
FIG. 3 is an illustration of an integrated photosensor array, memory and a processor for the biometric sensing system.

If the biometric sensor 12 includes the chip 40 shown in FIG. 3, it can perform comparisons extremely quickly. The chip 40 includes an active pixel sensor 42, first, second, third and fourth memory blocks 44, 46, 48 and 50, and a correlator 52. The memory blocks 44-50 may be linear arrays of registers, each block being capable of storing a line of pixels from the sensor 12. The chip 40 can perform thousands of correlations per second. At the present time, rates of 20,000 correlations per second have been demonstrated. A biometric sensor 12 using the chip 40 can take a "brute force" approach towards biometric identification and authentication, performing re-orientation and correlation for each image, and accessing many different images from the database. Yet at a rate of 20,000 correlations per second, the biometric sensor 12 can correlate 200 images per person and identify a face in a crowd of 500 people in no more than five seconds. The active pixel sensor 42 is also light weight, compact, durable, and has low power consumption.

Referring to FIG. 3, the active pixel sensor 42 is a CMOS device that includes a two-dimensional array of pixels. The pixels sense the physical attribute as domains of lightness and darkness. The pixels are read out one line at a time and buffered in the first memory block 44. When the first memory block 44 is filled with a line of pixels, its contents are shifted to the second memory block 46.

As the image is being read out from the active pixel sensor 42, a reference image is supplied to the chip 40, one line at a time. When a full line of pixels of the reference image and a full line of pixels of the input image are available, the correlator 52 performs a correlation on the two lines. Thus the correlator 52 performs correlations one line at a time. The correlator 52 keeps track (e.g., a running sum) of the total correlation for the input image. After all lines have been correlated, the correlator 52 sends the total correlation (CORR) to a comparator 58. The comparator 58 compares the total correlation (CORR) to a reference value (CORR_REF). An output of the comparator 58 indicates whether the total correlation (CORR) is within acceptable limits.

A multiplexer 54 and demultiplexer 56 allow for a pipelined architecture. As one line of the reference image is being used for the correlation, another line is read into the chip 40.

If another correlation is performed, the reference source (e.g., the database) either provides a new reference image to the chip 40, one-line at a time, or it re-orients the original reference image and provides the re-oriented reference image, one line at a time.

The correlator 52 may perform a correlation method such as the following sum-of-squared-difference method:

$$C = (IN_1 - REF_1)^2 + (IN_2 - REF_2)^2 + (IN_3 - REF_3)^2 + \ldots + (IN_N - REF_N)^2$$

where $IN_n$ represents the intensity value stored in the $n^{th}$ register of the second memory device 46, $REF_n$ represents the intensity value stored in the $n^{th}$ register of either the third or fourth memory device 48 or 50 (depending upon the selection by the multiplexer 56), N represents the total number of registers (and pixels) in the memory blocks 44-50, and C represents the sum-of-squared-difference for a line of pixels. A running sum (CORR) of the sum-of-squared-differences may be stored in register memory in the correlator 52. After the entire image has been correlated, the running sum (CORR) is compared to the reference value (CORR_REF).

The chip 40 may be packaged in a way that makes the biometric sensor 12 lightweight, compact, and durable. For example, the chip 40 may be encapsulated in a clear plastic package, with a plastic lens built up on the package. Integrating the lens in such a manner reduces parts count and reduces the chance of misalignment between the lens and the sensor 42. The mounting is rigid and rugged to ensure that the optical alignment is maintained in a fixed relationship.

An illuminator may also be packaged with the chip 40. The illuminator and the chip 40 may be packaged on the same PC board. The illuminator generates a beam of light that illuminates the physical attribute. Wavelength of the light will depend upon the active pixel sensor 42. If the active pixel sensor 42 can detect infrared radiation (IR), the illuminator provides IR for illuminating the physical attribute. The illuminator is optional; it is not needed if the attribute is illuminated by an external source, or if the attribute can be illuminated adequately by background radiation.

The light may be collimated or non-collimated. Non-collimated light may be used for illuminating attributes that are distant from the active pixel sensor 42. Collimated light may be used for illuminating attributes that are near the active pixel sensor 42.

Figure 4:
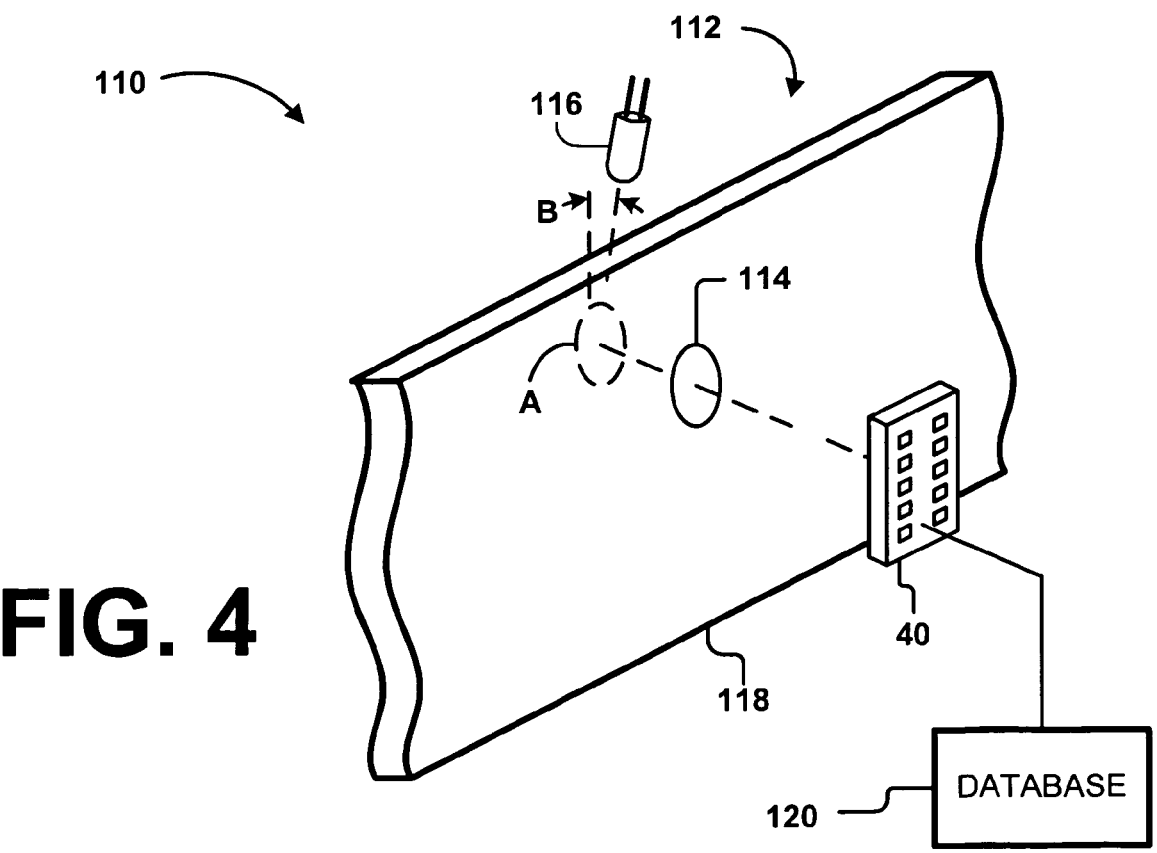
FIG. 4 is an illustration of a biometric fingerprint system according to the present invention.

Reference is now made to FIG. 4, which shows a biometric fingerprint system 110 including a biometric sensor 112. The biometric sensor 112 includes the chip 40, a lens 114, an illuminator 116, and a plastic pane 118. The plastic pane 118 may form a part of a plastic housing, and the lens 114 may be integrated with the housing. The pane 118 also provides a scanning plane. During biometric sensing, a fingerprint may be captured by pressing a finger against the pane 118.

The light from the illuminator 116 grazes the finger at a grazing angle B and illuminates an area A of the fingerprint. The grazing angle B is the angle from the surface of the area A, or the complimentary angle of the angle of incidence. The grazing angle B might be less than 15 degrees. The light grazing the illuminated finger is scattered by the ridges on the finger, and produces the high number of domains of lightness and darkness.

The detectability of the fingerprint may be enhanced by reducing the grazing angle. Generally, higher grazing angles will result in a lower signal-to-noise (SNR) ratio from these surfaces, and lower grazing angles will result in a higher SNR ratio despite a lower signal. The higher SNR will make it easier to observe and detect the random features and will be less prone to errors caused by noise.

Collimated light has been found to work well for grazing illumination in that it provides good contrast in surface features that derive from surface profile geometry.

Uniform illumination of the surface area A is desirable. The illuminator 116 may include one or more LEDs and integrated or separate projection optics. Such optics might include diffractive optic elements that homogenize the light emitted by the LEDs. Multiple LEDs might allow for a more uniform illumination than a single LED.

The illuminator 116 may instead include one or more lasers or cavity resonant LEDs instead of regular LEDs. The lasers would generate coherent light. The regular LEDs, in contrast, would generate non-coherent or only partially coherent light.

The chip 40 is connected to a database 120. The database 120 stores a plurality of reference image sets. Each image set may show different views, different sizes and different orientations of the same attribute. The different sets may be associated with different attributes.

The biometric sensing system is not limited to the specific embodiments described above. For example, the lens 114 could be a telecentric lens. A telecentric lens gives depth of field while holding magnification constant. Consequently, the telecentric lens relaxes positioning requirement and manufacturing tolerance and focus. The lens 114 may be eliminated if the active pixel sensor 42 can be moved very close to the scanning plane.

Other correlation algorithms could be used. Other algorithms might include sum of products, normalized sums of products, root-mean-sums-of-squared-differences, normalized sums of squared differences, sums of absolute differences, normalized sums of absolute differences, etc.

The biometric device is not limited to performing correlations one line at a time. Correlations could be performed one pixel at a time, one frame at a time, or any multiples thereof (e.g., two frames at a time). Performing correlations one pixel at a time would be slower than performing correlations one line at a time, and performing correlations one frame at a time would be much faster than performing correlations one line at a time. However, performing correlations one or more frame at a time would increase the size, complexity and price of the biometric sensor. Thus a trade-off is involved.

The biometric sensing system is not limited to an active pixel sensor. Other sensors such as charge coupled devices may be used instead. However, charge coupled devices are not as fast as active pixel sensors.

The biometric sensing system is not limited to a database that provides pre-shifted and pre-rotated reference images. The sensor may instead perform the shifting and rotation. For example, the sensor can shift up, down, left, right, and diagonally towards the four corners of the image. It can also be made to perform rotations as well by shifting in a circle. During authentication based on a thumbprint, for example, the database may provide only a single reference image of the thumbprint, and the sensor generates an input image. The sensor also shifts and rotates the input image to generate additional images. The reference image is correlated with each of these additional images. This operation is also illustrated in FIG. 2, except that the sensor provides the additional images (block 104) instead of the database.

The present invention is not limited to the specific embodiment described above. Instead, the invention is construed according to the claims that follow.

What is claimed is:

1. A biometric sensing method comprising:
generating an input digital image of a human attribute;
inputting the image one portion at a time; and
correlating domains of lightness and darkness in each portion of the input image to domains of lightness and darkness in a corresponding portion of a reference digital image, each portion of the input image being correlated while another portion is being inputted, a running sum of the correlations being computed over the entire image; whereby the running sum can be compared to a reference value after the entire input image has been correlated.

2. The method of claim 1, further comprising creating at least one additional image, from the input image, each additional image showing the attribute at a different orientation, view or size; and correlating each additional image with the reference image.

3. The method of claim 1, wherein for each portion of the input image, the correlating includes computing differences between pixels in the input image and their corresponding pixels in the reference image.

4. The method of claim 1, further comprising correlating the input image with at least one additional reference image, each additional image showing the attribute at a different orientation, view or size.

5. The method of claim 4, further comprising accessing the reference images from a database.

6. The method of claim 1, further comprising illuminating the attribute as the input image is being generated.

7. The method of claim 1, wherein a sensor is used to generate the input image; wherein the sensor is placed proximate the attribute; and wherein the attribute is illuminated by focusing a beam of collimated light onto the attribute at a grazing angle.

8. The method of claim 1, wherein a sensor is used to generate the input image; wherein the sensor is distant from the attribute; and wherein the attribute is illuminated by focusing a beam of non-collimated light onto the attribute.

9. The method of claim 1, wherein a 2-D active pixel sensor is used to generate the input image.

10. The method of claim 9, wherein the comparisons are performed at a rate of at least 20,000 per second.

11. The method of claim 1, wherein an image sensor is used to generate the input image; and wherein the domains are correlated one line at a time.

12. A biometric sensing system comprising:
a 2-D active pixel sensor (APS) for generating an input image of a human attribute; and
a processor for correlating domains of lightness and darkness in the input digital image to domains of lightness and darkness in a reference digital image, the processor having a pipelined architecture for correlating the input image one portion at a time, the processor computing a running sum of the correlations.

13. The system of claim 12, wherein the processor includes first and second buffers, the first buffer buffering an image portion while a portion in the second buffer is being compared to a reference image.

14. The system of claim 12, wherein the input image is correlated one line at a time.

15. The system of claim 12, further comprising a database for storing at least one additional reference image, each additional image showing the attribute at a different orientation, view or size; wherein the processor performs the correlation of each additional image with respect to the input image.

16. The system of claim 12, wherein each correlation includes taking differences between pixels in the input image and spatially corresponding pixels in a reference image.

17. The system of claim 12, further comprising an illuminator for illuminating the attribute as the sensor generates the input image.

18. The system of claim 17, wherein the illuminator provides a beam of collimated light onto a scanning plane at a grazing angle.

19. The system of claim 17, wherein illuminator supplies a beam of non-collimated light.

20. The system of claim 17, wherein the sensor and processor are on a single chip.

21. The system of claim 20, further comprising a focusing lens; and a package for the chip, the lens built up on the package.

22. A biometric sensor comprising:
a light source and optics for illuminating a human attribute at a grazing angle;
a sensor for providing an image of the illuminated human attribute; and
a processor for correlating domains of lightness and darkness in the image to domains of lightness and darkness in a reference digital image.

23. A chip for a biometric sensor, the chip comprising:
a 2-D photosensor array having M lines;
a first memory block for buffering L lines of data received from the photosensor array, where L<M;
a second memory block for receiving the L lines of data from the first memory block after the first memory block has been filled;
a third memory block for storing L lines of reference data; and
a correlator for correlating the data in the second memory block to the data in the third memory block, the correlator keeping a running sum over all M lines, the data in the second memory block being correlated while the first memory block is being filled, the data in the second memory block overwritten after it is correlated.

24. The chip of claim 23, further comprising a fourth memory block and a multiplexer, the third and fourth memory blocks receiving L lines of the reference data in an alternating sequence, the multiplexer sending the L lines of one of the third and fourth blocks to the correlator while the other of the third and fourth blocks is being filled.

25. The chip of claim 23, wherein the photosensor array is a 2-D active pixel sensor.

26. The chip of claim 23, wherein L=1, whereby the correlator performs correlations one line at a time.

* * * * *